United States Patent
Sunata

(10) Patent No.: US 10,739,756 B2
(45) Date of Patent: Aug. 11, 2020

(54) MANAGEMENT SYSTEM AND METHOD FOR CONSUMABLES USED TO FORM THREE-DIMENSIONAL OBJECT

(71) Applicant: CANON KABUSHIKI KAISHA, Tokyo (JP)

(72) Inventor: Jin Sunata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 15/466,152

(22) Filed: Mar. 22, 2017

(65) Prior Publication Data

US 2017/0285617 A1    Oct. 5, 2017

(30) Foreign Application Priority Data

Mar. 31, 2016 (JP) .................................. 2016-072592

(51) Int. Cl.
*G05B 19/4099* (2006.01)
*G03G 15/00* (2006.01)

(52) U.S. Cl.
CPC ....... *G05B 19/4099* (2013.01); *G03G 15/553* (2013.01); *G05B 2219/49023* (2013.01); *Y02P 80/114* (2015.11)

(58) Field of Classification Search
None
See application file for complete search history.

(56) References Cited

U.S. PATENT DOCUMENTS

| | | | | |
|---|---|---|---|---|
| 6,497,469 | B1 * | 12/2002 | Shinada | B41J 2/17503 347/19 |
| 2002/0062314 | A1 * | 5/2002 | Hisasue | G06Q 10/087 |
| 2003/0050873 | A1 * | 3/2003 | Niki | G06Q 10/087 705/28 |
| 2004/0249499 | A1 * | 12/2004 | Green | G01K 3/04 700/225 |
| 2010/0238206 | A1 * | 9/2010 | Harris | B41J 2/175 347/7 |
| 2014/0117585 | A1 * | 5/2014 | Douglas | B29C 47/92 264/401 |

FOREIGN PATENT DOCUMENTS

| | | |
|---|---|---|
| JP | 2001-047637 A | 2/2001 |
| JP | 2002-111943 A | 4/2002 |
| JP | 2003-159854 A | 6/2003 |
| JP | 2005-221606 A | 8/2005 |
| JP | 2008-269476 A | 11/2008 |

* cited by examiner

*Primary Examiner* — Bernard G Lindsay
(74) *Attorney, Agent, or Firm* — Canon U.S.A., Inc. IP Division

(57) ABSTRACT

A management system according to the aspect of the embodiments performs expiration date management of consumables delivered for a forming apparatus to be managed, based on an expiration date for consumption after manufacturing of each consumable and an expiration date for consumption after opening of each consumable. The management system then automatically makes arrangement for collecting expired consumables.

10 Claims, 13 Drawing Sheets

FIG.7A
QUALITY INFORMATION ABOUT CONSUMABLE

| MODEL NAME | ABC001 |
|---|---|
| MANUFACTURING MANAGEMENT NUMBER | SNxxxxxxxxxxxxxxx |
| YEAR, MONTH, AND DATE OF MANUFACTURING | 2016/01/10 |
| EXPIRATION YEAR, MONTH, AND DATE FOR CONSUMPTION | 2017/1/9 |
| EXPIRATION DATE FOR CONSUMPTION AFTER OPENING | 40 |
| UNIT OF EXPIRATION DATE FOR CONSUMPTION AFTER OPENING | Day |
| RECOMMENDED TEMPERATURE 1 | 5°C |
| RECOMMENDED TEMPERATURE 2 | 40°C |
| RECOMMENDED HUMIDITY 1 | 30 |
| RECOMMENDED HUMIDITY 2 | 55 |

FIG.7B
CONSUMABLE MANAGEMENT TABLE

| MODEL NAME | ABC001 |
|---|---|
| MANUFACTURING MANAGEMENT NUMBER | SNxxxxxxxxxxxxxxx |
| YEAR, MONTH, AND DATE OF DELIVERY | 2016/2/1 |
| CUSTOMER ID | aaa |
| YEAR, MONTH, AND DATE OF OPENING | 2016/2/3 |

| MODEL NAME | ABC001 |
|---|---|
| MANUFACTURING MANAGEMENT NUMBER | SNxxxxxxxxxxxxzzz |
| YEAR, MONTH, AND DATE OF DELIVERY | 2015/3/1 |
| CUSTOMER ID | aaa |
| YEAR, MONTH, AND DATE OF OPENING | |

FIG.7C
EXPIRED CONSUMABLE LIST

| MODEL NAME | MANUFACTURING MANAGEMENT NUMBER | YEAR, MONTH, AND DATE OF DELIVERY | YEAR, MONTH, AND DATE OF OPENING | EXPIRATION DATE FOR CONSUMPTION | EXPIRATION DATE AFTER OPENING |
|---|---|---|---|---|---|
| ABC001 | SNxxxxxxxxxxxxxxx | 2016/2/1 | 2016/2/3 | | ON |
| ABC001 | SNxxxxxxxxxxxxzzz | 2015/3/1 | | ON | |
| | | | | | |

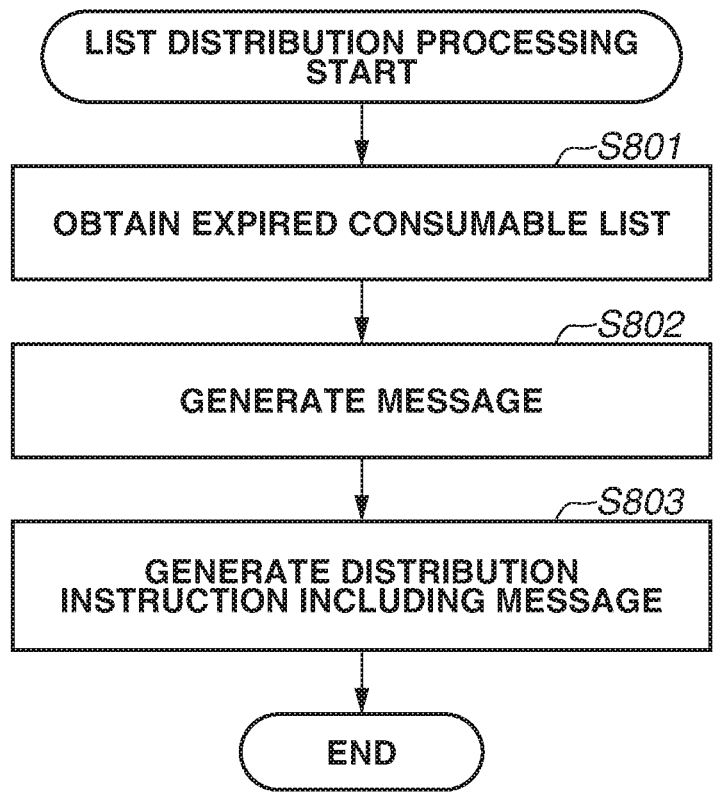

FIG.10A

[WARNING]
CONSUMABLE [FORMING PLA WHITE: ABC0001] IS 4 DAYS PAST ITS EXPIRATION DATE FOR CONSUMPTION. TO AVOID STRENGTH DEGRADATION OR CRACKING, REPLACE WITH NEW ONE.

YEAR, MONTH, AND DATE OF DELIVERY: ○○○○/□□/△△
   YEAR, MONTH, AND DATE OF OPENING: ○○○○/□□/××

CONSUMABLE ABC0001 WAS ORDERED FROM DELIVERY CENTER ON 02 MARCH 2016 AT 13:05.

[ REPLACE ]

FIG.10B

[WARNING]
CONSUMABLE [FORMING PLA WHITE: ABC0001] IS 4 DAYS PAST ITS EXPIRATION DATE FOR CONSUMPTION.
   YEAR, MONTH, AND DATE OF DELIVERY: ○○○○/□□/△△
   YEAR, MONTH, AND DATE OF OPENING: ○○○○/□□/××

**STRENGTH DEGRADATION OR CRACKING MAY OCCUR.
ARE YOU SURE YOU WANT TO PROCEED WITH MODELING OUTPUT?**

[ YES ]      [ RETURN ]

FIG.12

INVENTORY MANAGEMENT TABLE

| CUSTOMER ID | aaa |
|---|---|
| FORMING APPARATUS IDENTIFIER | YYYYYYYY |
| CONSUMABLE MODEL NAME | ABC001 |
| UPPER LIMIT OF INVENTORY | 5 |
| OUT-OF-INVENTORY THRESHOLD | 2 |
| INVENTORY QUANTITY | 3 |

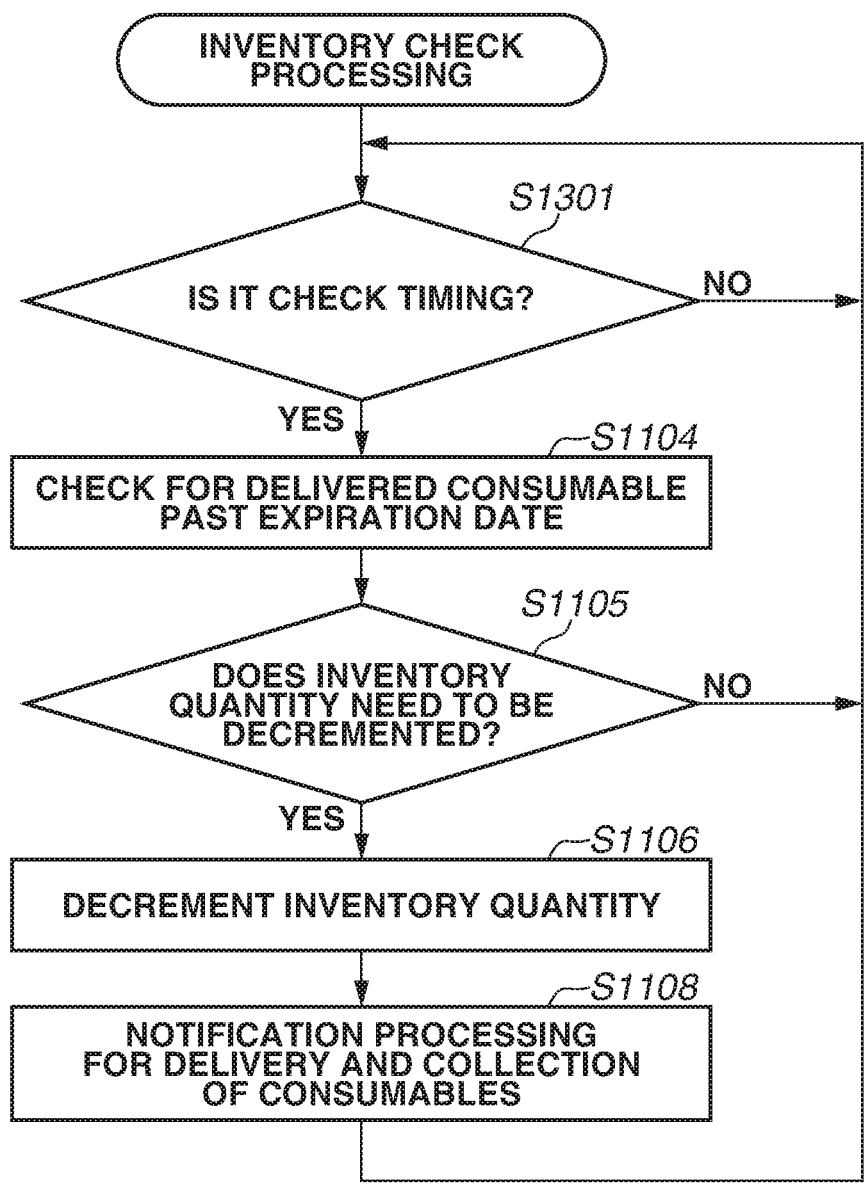

MANAGEMENT SYSTEM AND METHOD FOR CONSUMABLES USED TO FORM THREE-DIMENSIONAL OBJECT

BACKGROUND OF THE INVENTION

Field of the Invention

The aspect of the embodiments relates to a method for managing a material used in a forming apparatus which forms a three-dimensional object.

Description of the Related Art

There have heretofore been systems which collect operation information about image forming apparatuses for forming an image on a sheet, such as a printing apparatus and a copying machine, via a network and do maintenance. For example, Japanese Patent Application Laid-Open No. 2003-159854 discusses a technique for receiving a notification related to a remaining amount of a consumable, such as toner, from an image forming apparatus and performing inventory management of the consumable.

Forming apparatuses, or three-dimensional (3D) printers, for forming a 3D object have become widely used in recent years. The foregoing management system may be used to do maintenance of forming apparatuses on a network in the future.

For the sake of continuous operation, a customer who owns a 3D printer holds an inventory of consumables including materials at an installation location of the 3D printer. The management system therefore needs to manage the size of the inventory of consumables for the 3D printer by the customer and arrange delivery of consumables to prevent the inventory from running out.

There are 3D printers of various forming methods. Various materials are provided according to the intended purposes of objects. Management of materials for 3D printers needs special consideration. Some materials need to be managed for quality maintenance. For example, polylactic acid (PLA) or polylactide of plant origin and polyvinyl alcohol (PVA) for use as a support material are susceptible to humidity, and can gradually degrade in quality after the containers of the materials are unpacked. Stereolithography often uses resin, which is susceptible to ultraviolet rays and discolors when placed long in a location exposed to light. If a 3D printer processes food, the inventory of materials for forming use needs best-before date management.

The consumables discussed in the foregoing Japanese Patent Application Laid-Open No. 2003-159854 are inks and toners used in a printing apparatus. Such consumables are less likely to degrade in quality even if stocked for a relatively long time. In Japanese Patent Application Laid-Open No. 2003-159854, no particular consideration is therefore given to the foregoing issue.

SUMMARY OF THE INVENTION

According to an aspect of the embodiments, a management system for managing operation information about a forming apparatus configured to form a three-dimensional object, the operation information being transmitted via a network from a monitoring apparatus configured to monitor the forming apparatus includes a management unit configured to manage identification information about a consumable including a material delivered for the forming apparatus in a storage device, a reception unit configured to receive a message including information equivalent to a time of opening of the consumable from the monitoring apparatus, a determination unit configured to determine a consumable from among consumables identified by identification information, the consumable being one that is passed at least either a first expiration date indicating an expiration date for consumption after manufacturing of the consumable or a second expiration date indicating an expiration date for consumption after opening of the consumable, or one that reaches at least either one of the first and second expiration dates after a lapse of a predetermined time, and a notification unit configured to make a notification including the identification information about the determined consumable so that the determined consumable is collected.

Further features of the disclosure will become apparent from the following description of exemplary embodiments with reference to the attached drawings.

BRIEF DESCRIPTION OF THE DRAWINGS

FIGS. 7A, 7B, and 7C are diagrams illustrating examples of a data table about consumables managed by the management system.

FIG. 8 is a flowchart for describing distribution processing of an expired consumable list by the management system.

FIGS. 10A and 10B are diagrams illustrating examples of a warning screen displayed on a display unit of the forming apparatus.

FIG. 12 illustrates an example of an inventory management table managed by the management system.

FIG. 13 is a flowchart for describing processing for checking expiration of stocked consumables by the management system.

DESCRIPTION OF THE EMBODIMENTS

Exemplary embodiments for carrying out the disclosure will be described below with reference to the drawings.

Figure 1:
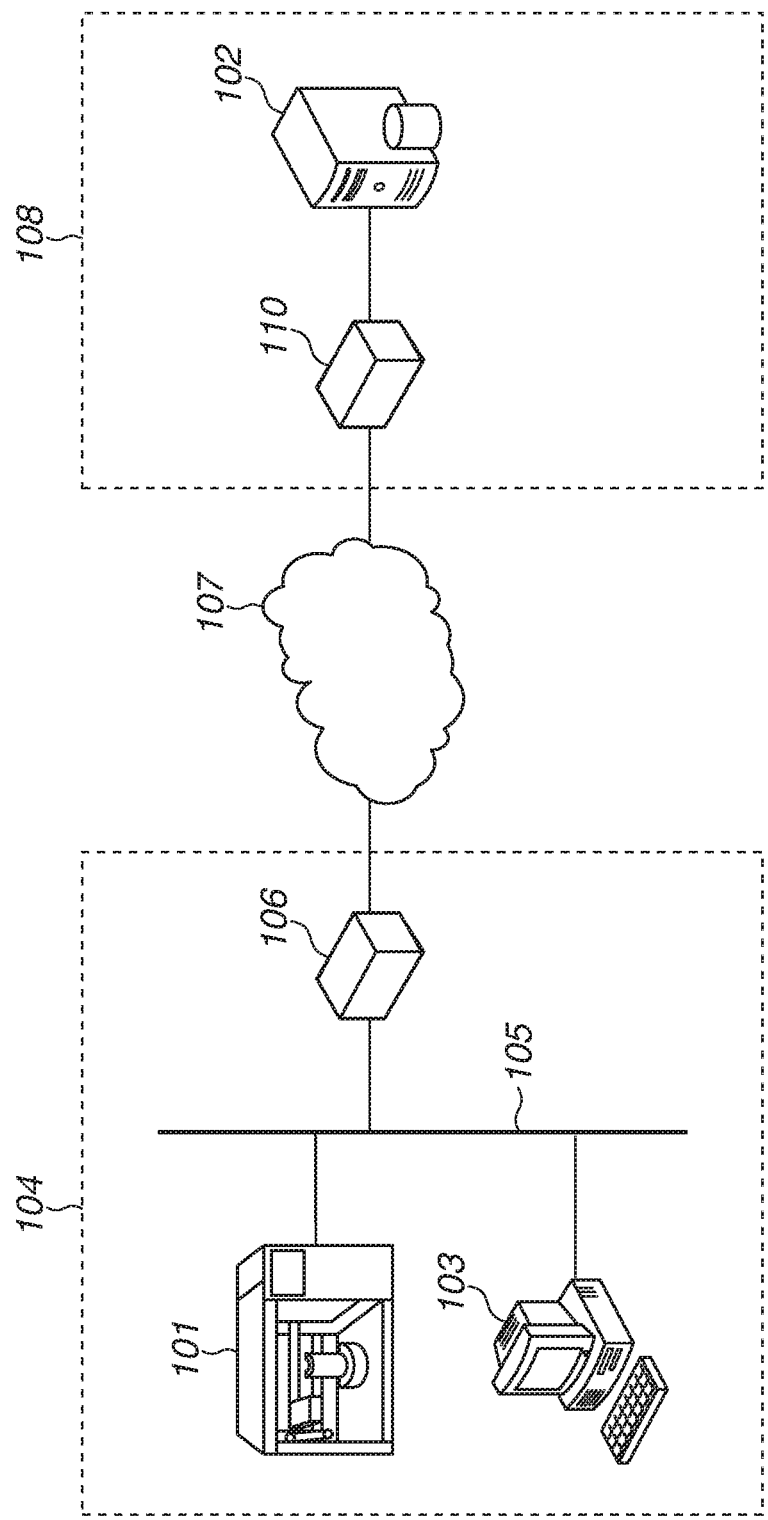
FIG. 1 is a diagram illustrating an example of a system configuration according to an exemplary embodiment of the disclosure.

FIG. 1 illustrates an example of a system configuration according to an exemplary embodiment of the disclosure.

A forming apparatus 101 for forming a three-dimensional object is installed on a site 104, where a personal computer (PC) 103 used by a user who owns the forming apparatus 101 is installed. The forming apparatus 101 and the PC 103 are connected via a network 105 such as a local area network (LAN). The forming apparatus 101 performs forming processing of a three-dimensional object using forming data input from the PC 103 or a not-illustrated Universal Serial Bus (USB) memory.

A management system 102 constructed using one or more server computers is installed on a site 108 such as a data center. The management system 102 analyzes device information and operation information about one or more forming apparatuses, collected via a network 107 such as the Internet, and provides services such as device management, maintenance, and inventory management of consumables.

The device information includes individual identification information and model information about the forming apparatus(es), and communication information such as an Internet Protocol (IP) address and a media access control (MAC) address. The operation information includes fault information and status information detected by various sensors included in the forming apparatus(es), log information about forming processing, information indicating a use status of consumables, and information indicating a replacement record of consumables. The consumables include replaceable parts used in the forming apparatus(es), consumable materials themselves such as a material and a support material, and consumable material containers containing consumable materials like a cartridge and a bottle. The management system 102 provides an inventory management service based on the quantities (such as weight and number) of the consumables.

To connect the sites 104 and 108, network devices 106 and 110 are installed at gateways of both environments. Examples of the network devices 106 and 110 include a firewall and a router.

Figure 2:
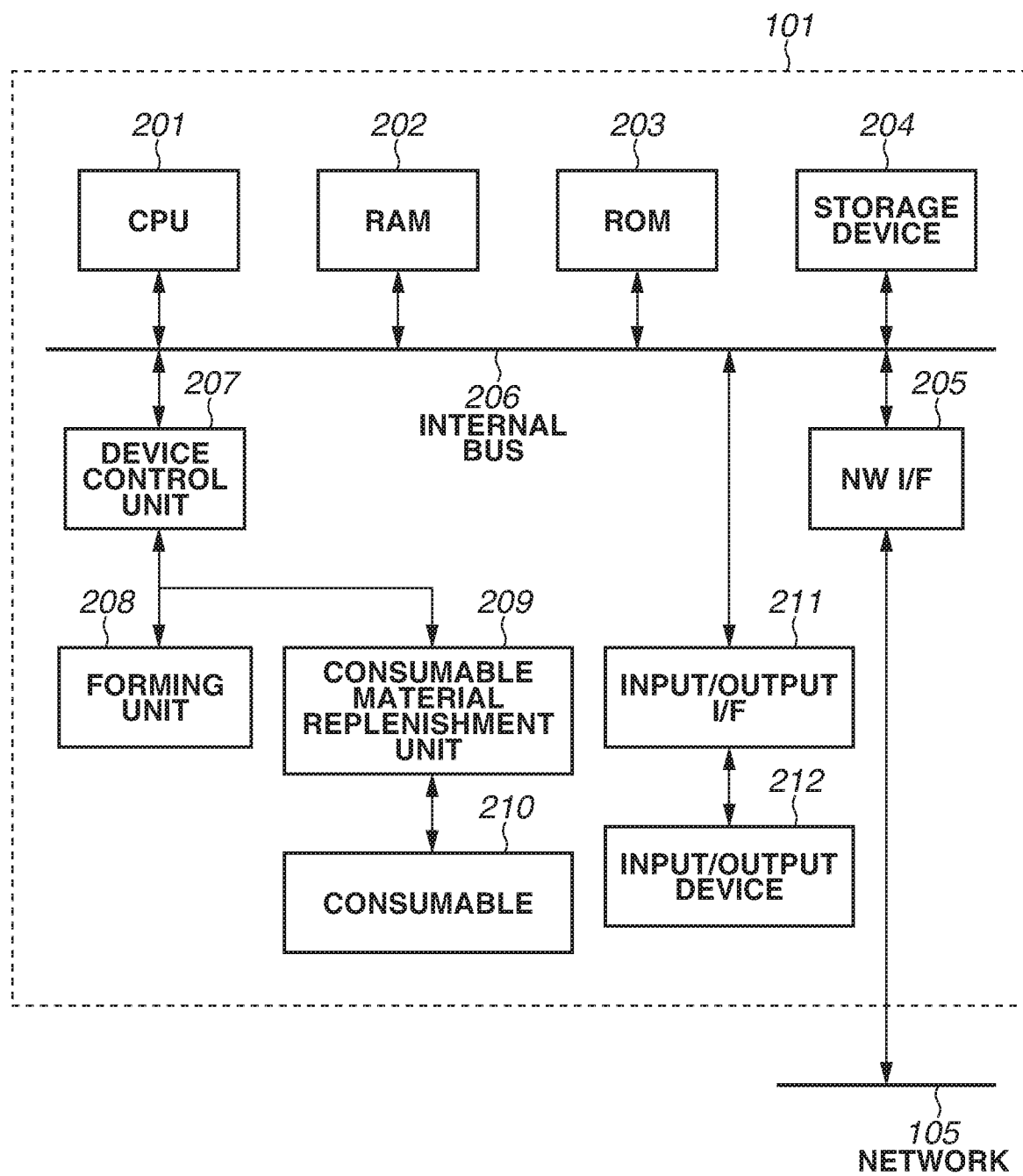
FIG. 2 is a diagram illustrating an example of a hardware configuration of a forming apparatus according to the exemplary embodiment of the disclosure.

FIG. 2 illustrates an example of a hardware configuration of the forming apparatus 101.

A central processing unit (CPU) 201 executes programs stored in a read-only memory (ROM) 203 or a storage device 204 such as a hard disk, and controls various devices in the forming apparatus 101 via an internal bus 206 in a centralized manner. A random access memory (RAM) 202 functions as a memory and a work area of the CPU 201. The ROM 203 stores built-in programs and data. The ROM 203 also stores individual identification information, model information, and destination information indicating a region to which the forming apparatus 101 is shipped. The storage device 204 stores forming data for use in performing forming processing. The storage device 204 also stores operation information about the forming apparatus 101. The operation information is needed for device management by the management system 102. The storage device 204 further stores a monitoring program for performing monitoring of the forming apparatus 101 and transmission control of the operation information with respect to the management system 102. A network interface (NW I/F) 205 is an interface for connecting to the network 105.

A device control unit 207 is a configuration for controlling a mechanical mechanism of a forming unit 208 which executes the forming processing, and exchanging status signals. For example, the device control unit 207 performs drive control on a stepping motor for driving a stage inside the forming unit 208. The device control unit 207 is also connected to a consumable material replenishment unit 209, and performs control to supply a consumable material from a consumable 210 to the forming unit 208.

The forming unit 208 may have various internal configurations (configurations for curing stacked layers of material) depending on a forming method supported by the forming apparatus 101. The type of consumable material to be replenished also varies depending on the forming method. For example, if the forming method is stereolithography, an ultraviolet laser beam or an ultraviolet flash mechanism is used to cure a photocurable resin serving as a material. In the case of powder sintering, a laminated object (an additive manufacturing object) is formed by sintering a powdered material by high-output laser irradiation. Examples of the powdered material include powdered resin of nylon and metal powders of copper, nickel, and titanium. In the case of fused deposition modeling, a forming head for extruding a thermoplastic material melt to a semi-liquid state is driven to form a laminated object.

The device control unit 207 can obtain information such as the type of consumable and the amount of supply to the forming unit 208 from the consumable material replenishment unit 209. The device control unit 207 stores the obtained information about the consumable 210 into the storage device 204. If the consumable 210 is a consumable material container such as a bottle and a cartridge mounted on the forming apparatus 101, the device control unit 207 can obtain information such as the type of consumable, an individual identifier of the consumable 210, and the remaining amount of the consumable material in the container. The consumable material replenishment unit 209 includes a sensor for wirelessly reading information embedded in the mounted consumable material container. If a plurality of types of materials and/or support materials is individually replenished, the device control unit 207 can individually obtain information about such consumable materials from the consumable material replenishment unit 209.

The consumable material replenishment unit 209 can write information about early removal and a use state of the consumable 210 that is a consumable material container, such as a bottle and a cartridge, into a memory included in the consumable 210. From such information, the consumable material replenishment unit 209 can determine whether the consumable 210 is a new one or remounted one when the consumable 210 is mounted. The device control unit 207 stores such information serving as a replacement history of the consumable 210 into the storage device 204.

The information about the consumable 210, obtained by the device control unit 207 via the consumable material replenishment unit 209, is part of the operation information to be transmitted to the management system 102.

An input/output interface (input/output I/F) 211 connects to an input/output device 212, displays information about an operation of the forming apparatus 101, and accepts operation instructions to the forming apparatus 101. The input/output device 212 includes a display device, such as a liquid crystal display and a light-emitting diode (LED), and a numeral keypad. An integrated input/output device such as an electrostatic or pressure-sensitive touch panel display may be used. Aside from the devices for display and operation, the input/output device 212 may include a speaker to issue a warning or a notification of completion of processing by sound. The input/output I/F 211 may be connected with a USB connector and/or a card slot so that the forming apparatus 101 can receive forming data via a USB memory or a flash card.

Aside from the foregoing components, the forming apparatus 101 includes sensors for detecting a failure or an abnormality of the components at a plurality of locations. For example, the forming unit 208 includes sensors for detecting abnormal temperature and abnormal humidity. Aside from hardware sensors, software sensors for detecting failures, abnormalities, and statuses are included. Such sensor information is provided to the management system 102 as the operation information along with the device information.

Figure 3:
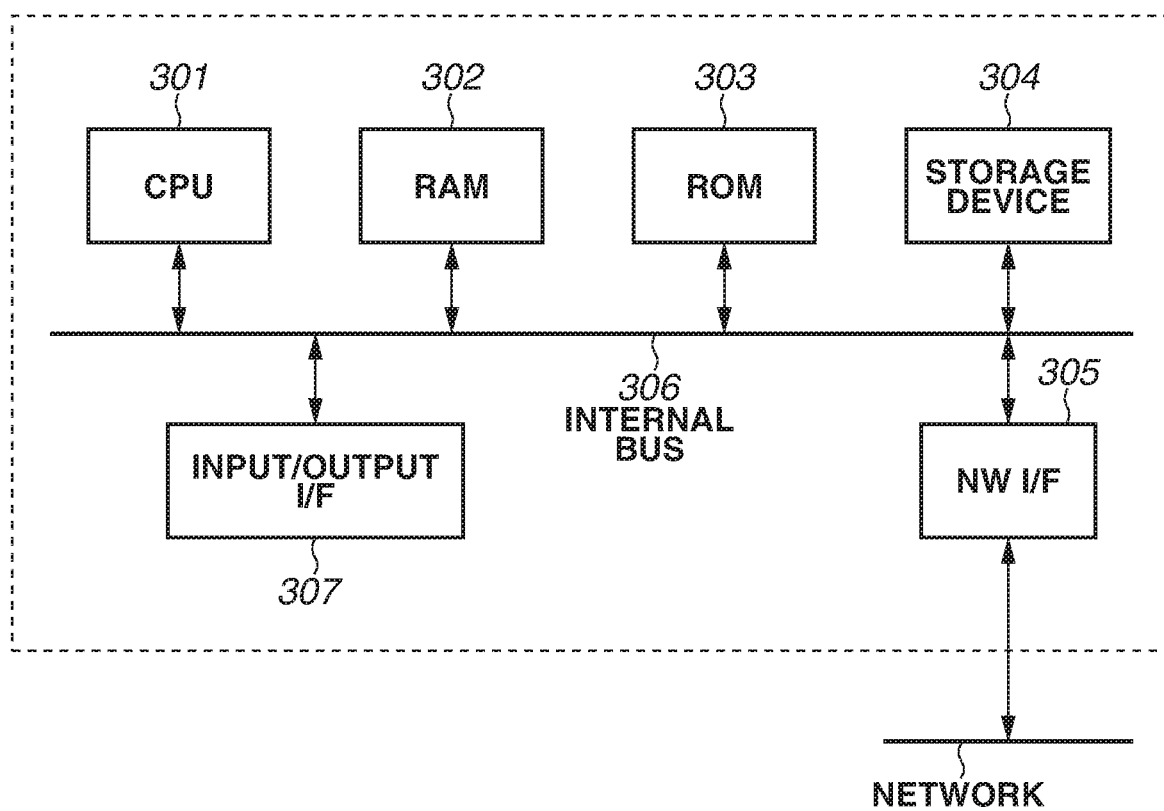
FIG. 3 is a diagram illustrating an example of a hardware configuration of an information processing apparatus according to the exemplary embodiment of the disclosure.

FIG. 3 illustrates an example of a hardware configuration of an information processing apparatus such as the server computer(s) constituting the management system 102 and the PC 103. The information processing apparatus includes a CPU 301, a RAM 302, a ROM 303, a storage device 304, an NW I/F 305, an input/output I/F 307, and an internal bus 306 which connects these devices.

The CPU 301 executes programs stored in the ROM 303 or the storage device 304 such as a hard disk, and controls the devices in the information processing apparatus via the internal bus 306. The RAM 302 functions as a memory and a work area of the CPU 301. The ROM 303 stores built-in programs and data.

The storage device 304 is a data storage area constituted by the hard disk in the information processing apparatus or a storage service on a network. In the management system 102, the storage device 304 stores programs for implementing functions of device management and inventory management. The storage device 304 further stores a device list including one or more forming apparatuses to be managed, and a contact address (such as a mail address) of a person in charge who arranges delivery of consumables in a sales company. Master information for managing specifications and performance of manageable forming apparatuses and types of usable consumables is also stored.

In the PC 103, the storage device 304 stores forming control software for generating forming data from model data expressing a three-dimensional object, and issuing forming instructions to the forming apparatus 101.

The NW I/F 305 is an interface for connecting to the network. The input/output I/F 307 is an interface for connecting to an external display such as a display or operation devices such as a keyboard and a mouse.

Figure 4:
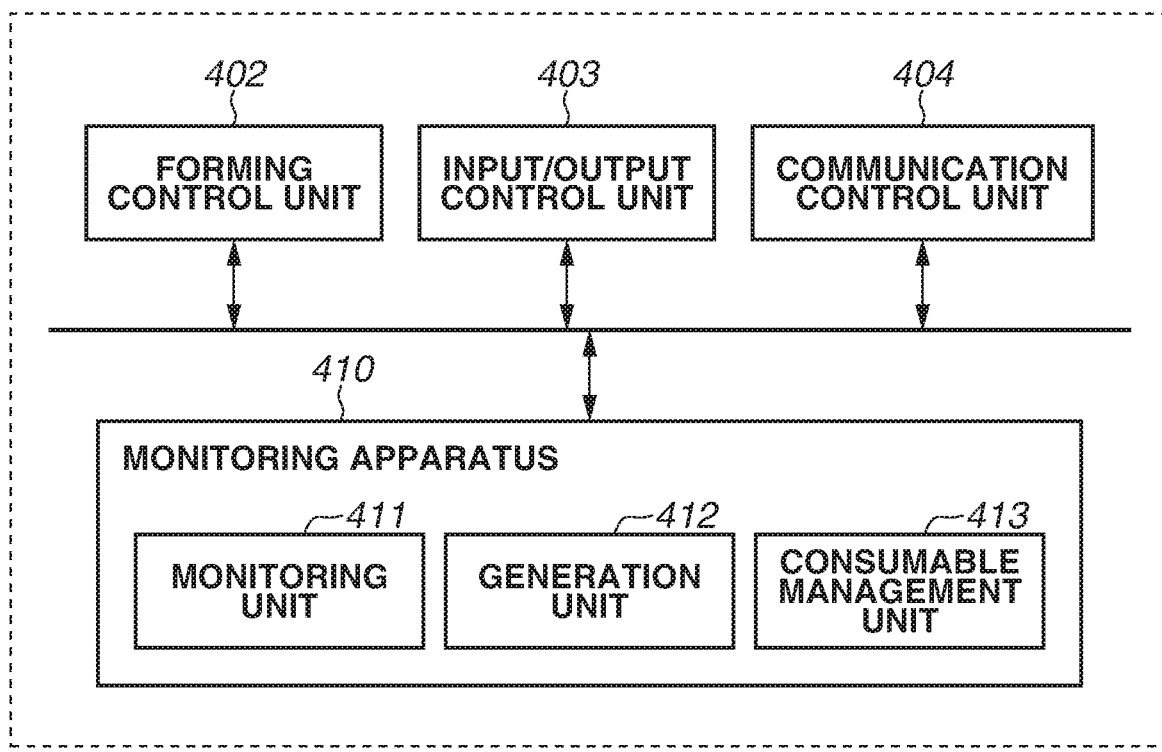
FIG. 4 is a diagram illustrating a configuration example of software modules of the forming apparatus according to the exemplary embodiment of the disclosure.

FIG. 4 illustrates a configuration example of soft modules of the forming apparatus 101. In such a module configuration, the modules are conceptual representations of processing subjects for performing processing implemented by one or more programs executed by the CPU 201. The modules operate in a cooperative manner with each other.

A forming control unit 402 is a module running on the device control unit 207. The forming control unit 402 executes forming processing based on forming data, controls an internal configuration of the forming unit 208, and executes processing such as exchange of status and other signals.

An input/output control unit 403 executes processing of operation instructions via the input/output I/F 211 and display processing via the input/output I/F 211 according to an instruction from the forming control unit 402 or a monitoring apparatus 410. A communication control unit 404 executes processing such as reception of forming data via the NW I/F 205 and message transmission to the network based on an instruction from the monitoring apparatus 410.

The monitoring apparatus 410, which transmits operation information to the monitoring system 102 and executes processing according to an instruction from the management system 102, is built in the forming apparatus 101. The forming apparatus 410 is implemented by executing a dedicated program by the CPU 201. The monitoring apparatus 410 is configured to include such modules as a monitoring unit 411, a generation unit 412, and a consumable management unit 413.

The monitoring unit 411 obtains operation information to be collected by the management system 102 from the storage device 204 of the forming apparatus 101 to be monitored based on an instruction from the monitoring system 102. The generation unit 412 generates a message including the operation information obtained by the monitoring unit 411 and the device information about the forming apparatus 101. The monitoring unit 411 instructs the communication control unit 404 to transmit the message generated by the generation unit 412 at a timing specified by the management system 102. For example, the operation information indicating a fault or consumable replacement is transmitted to the management system 102 at a transmission timing when the fault or the consumable replacement occurs. The operation information with no urgency or the operation information used for charging or reporting to the sales company is transmitted on a regular basis according to a specified schedule.

The consumable management unit 413 manages consumable information which is obtained by the device control unit 207 via the consumable material replenishment unit 209 and stored in the storage device 204. As described above, the consumable information includes the operation information about the consumables aside from the types of consumables and the identification information about the consumables. Examples of such operation information include an amount of supply of a consumable material, a consumed level of a consumable, and a replacement history. The consumable management unit 413 further executes processing for prompting use restrictions on consumables based on control information distributed from the management system 102. For example, the consumable management unit 413 displays a notification for suppressing the use of an expired consumable material via the input/output device 212. The consumable management unit 413 displays part of the information about the consumable 210, which has been obtained by the device control unit 207 via the consumable material replenishment unit 209, and quality information via the input/output device 212. The quality information is distributed from the management system 102 and includes names, dates of manufacturing, and expiration dates for consumption of consumables.

The monitoring apparatus 410 having a function of transmitting the device information or the operation information about the forming apparatus 101 may be installed as an information processing apparatus on the LAN 105, separately from the forming apparatus 101. In such a case, the monitoring apparatus 410 obtains the device information and the operation information from one or more forming apparatuses on the LAN 105, and transmits the obtained information to the management system 102.

In the present exemplary embodiment, communication protocols between the monitoring apparatus 410 and the management system 102 are assumed to be, but not limited to, such protocols as the Hypertext Transfer Protocol (HTTP) and HTTP Secure (HTTPS). Various communication protocols such as WebSocket and Simple Mail Transfer Protocol (SMTP) may be used.

Figure 5:
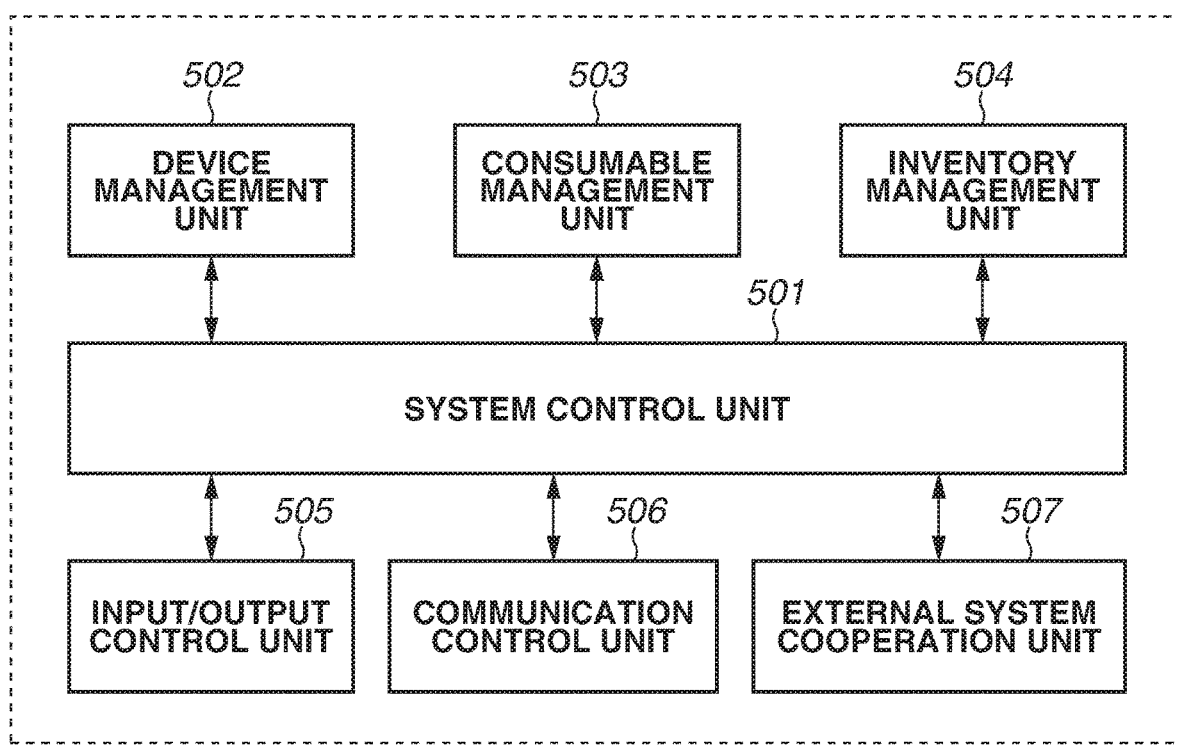
FIG. 5 is a diagram illustrating a configuration example of software modules of a management system according to the exemplary embodiment of the disclosure.

FIG. 5 illustrates a configuration example of software modules of the management system 102 according to the exemplary embodiment of the disclosure. In this module configuration, the modules are conceptual representations of processing subjects for describing processing implemented by the programs executed by the CPU 301. The modules operate in a cooperative manner with each other via a system control unit 501.

A device management unit 502 manages one or more forming apparatuses to be managed using the device information about the respective forming apparatuses. The device management unit 502 can refer to the master information based on a model or an individual identifier, and identify the model name of the forming apparatus 101 and the consumable information.

A consumable management unit 503 controls generation and transmission of a message including control information about the use of consumables with respect to the forming apparatus(es) to be managed. The control information includes the quality information such as names, dates of manufacturing, and expiration dates for consumption of the consumables used in the forming apparatus 101. Based on the control information, the forming apparatus(es) performs/perform processing for inhibiting or prohibiting the use of the consumables.

An inventory management unit 504 manages the consumed level of the consumables of the forming apparatus 101 using the operation information about the consumables, which has been notified by the monitoring apparatus 410. As will be described below in FIG. 12, the inventory management unit 504 manages the types and quantities (numbers and weights) of consumables stocked in an installation environment of the forming apparatus 101 by the customer. If an inventory quantity of a consumable is determined to fall below a predetermined threshold according to the consumed level of the consumable, the inventory management unit 504 automatically transmits a mail to the contact address of the serviceperson so that delivery of a new consumable is arranged. The inventory management unit 504 manages the identification information and the quality information about all the consumables including those stocked in the installation environment of the forming apparatus 101. If there is a consumable of which the expiration date for consumption has expired or is about to expire, the inventory management unit 504 automatically transmits a mail to the contact address of the serviceperson so that delivery of a new consumable for replacement is arranged.

An input/output control unit 505 is an interface for connecting a display device such as a display to be connected to the management system 102, and an input device such as a keyboard and a mouse. A communication control unit 506 controls communication with external apparatuses such as the forming apparatus 101.

An external system cooperation unit 507 is provided with information from a system that manages the quality information such as dates of manufacturing of consumables for forming apparatuses that can be managed. The external system cooperation unit 507 can obtain information such as dates of manufacturing and expiration dates for consumption along with types of consumables and individual identification information about the consumables. The external system cooperation unit 507 provides such quality information to the consumable management unit 503 or the inventory management unit 504.

Figure 6A:
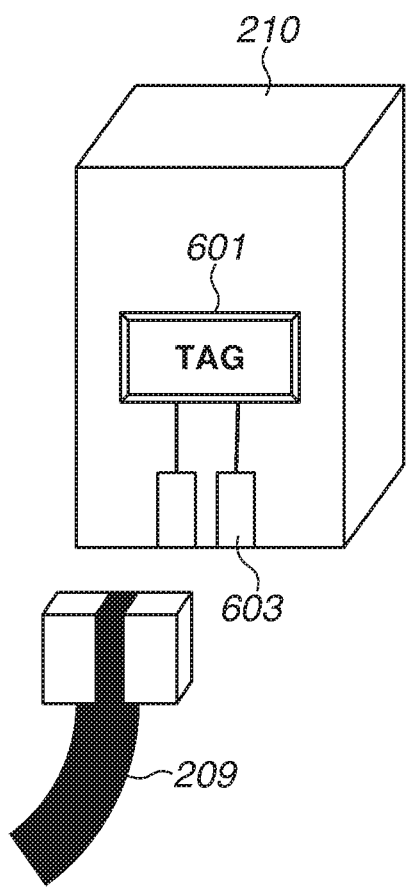
FIGS. 6A and 6B are diagrams illustrating an example of a structure of the forming apparatus and a consumable thereof.
Figure 6B:
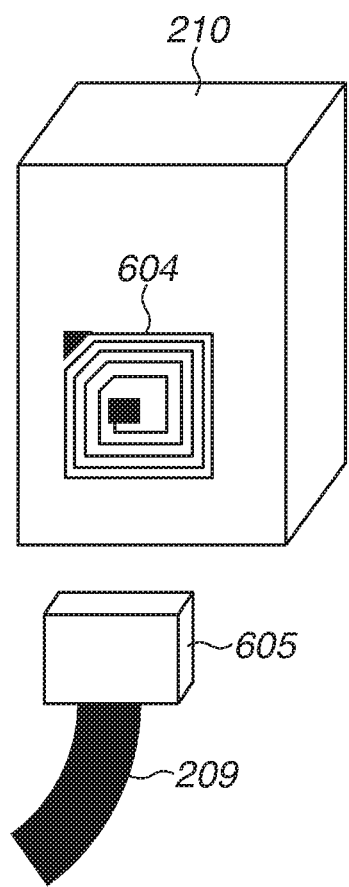

FIGS. 6A and 6B illustrate examples of a structure of the forming apparatus 101 and a consumable thereof.

FIG. 6A illustrates an appearance of a consumable 210 to be mounted on the forming apparatus 101. The consumable 210 is equipped with a tag 601 including a memory in which the consumable information is recorded. The consumable material replenishment unit 209 can read and write information from/to the memory via terminals 603. FIG. 6B illustrates a consumable 210 including a wireless tag 604. The consumable material replenishment unit 209 can read and write information from/to the memory attached to the consumable 210 via a wireless communication unit 605. The individual identification information about the consumable 210 and information written by the consumable material replenishment unit 209 are recorded in the memory of the consumable 210. The configuration of a consumable is not limited to such examples.

FIGS. 7A to 7C illustrate examples of data tables managed by the management system 102.

FIG. 7A illustrates an example of a data table for managing the quality information about a consumable, used by the consumable management unit 503 and the inventory management unit 504. Such a data table is provided and managed for each type of consumable and for each individual item identifiable by the individual identification information. The information managed by the data table is information obtained from the external system cooperation unit 507.

The managed quality information includes a "model name" which indicates a type of consumable, a "manufacturing management number" which is the individual identification information, and "year, month, and date of manufacturing" and "expiration year, month, and date for consumption" of the consumable. Information such as in which factory the consumable is manufactured can be identified from the "manufacturing management number". The "expiration year, month, and date for consumption" is information set for a consumable that degrades in quality with time.

The managed quality information further includes "expiration date for consumption after opening" and "unit of expiration date for consumption after opening". For a consumable that degrades more rapidly after opening of its package, such information is set as a period in which quality can be guaranteed, aside from an expiration date. For example, such information is set for a consumable including a material susceptible to humidity, air, or light.

Information about lower and upper limits of a "recommended temperature" and a "recommended humidity" which indicate the temperatures and humidities recommended for a use environment in using the consumable is also registered as the quality information.

The consumable management unit 503 performs control to transmit the quality information to the monitoring apparatus 410 of a site to which the consumable concerned is delivered. The quality information may be information that is static after manufacturing, and may be recorded in the internal memory of the consumable. In such a case, the quality information can be displayed on-screen on the forming apparatus 101. The monitoring apparatus 410 can display the "expiration year, month, and date for consumption" and the year, month, and date serving as the expiration date for consumption after opening on-screen on the forming apparatus 101 when the consumable is mounted. Such a screen display may be displayed only if the consumable is determined to be close to expiration. How many days before to display the screen display is stored as a setting in the monitoring apparatus 410. The management system 102 can instruct the monitoring unit 411 about the setting via the network.

FIG. 7B illustrates examples of a data table for managing information about a consumable that is delivered for the forming apparatus 101 installed on the site 104. The data table is referred to by the consumable management unit 503 and the inventory management unit 504. Such a data table is provided and managed for each type of consumable and for each individual item identifiable by the individual identification information.

The data table manages a "model name" which indicates the type of consumable, a "manufacturing management number" which is the individual identification information, "year, month, and date of delivery" of the consumable, and a "customer identifier (ID)" which is identification information about the customer who owns the forming apparatus 101 of the delivery destination. The management system 102 can use the customer ID to identify the site 104, the forming apparatus 101 owned by the customer, and the status of the inventory of consumables.

The data table also manages "year, month, and date of opening" of the consumable. For a consumable that is managed as an unused stock at the site 104, no information is set in the "year, month, and date of opening".

FIG. 7B illustrates management information about two consumables of the same type, delivered to the same customer. The respective pieces of management information include different values in the "manufacturing management number" and the "year, month, and date of delivery".

The time when a consumable is unpacked by the user before mounted on the forming apparatus 101 is difficult to be monitored or identified. In the exemplary embodiment of the disclosure, the time when the consumable is mounted on the forming apparatus 101 is then regarded as the time of opening. Specifically, the inventory management unit 504 of the management system 102 records the time (year, month, and date) of detection of replacement included in the message including the operation information indicating the replacement of the consumable, transmitted via the monitoring apparatus 410, as the "year, month, and date of opening".

FIG. 7C illustrates a list of delivered and expired consumables which the management system 102 manages customer by customer. The list (hereinafter, may be referred to as an "expired consumable list") is referred to by the consumable management unit 503 and the inventory management unit 504. The inventory management unit 504 registers information about a consumable into this list when the consumable is passed either its expiration date for consumption or its expiration date for consumption after opening. If a consumable in the list is collected by the serviceperson, the inventory management unit 504 deletes the information about the consumable from the list. FIG. 7C illustrates a list of expired consumables of a customer having a "customer ID" of "aaa".

This data table manages a "model name" which indicates the type of consumable, a "manufacturing management number" which is the individual identification information, "year, month, and date of delivery" of the consumable, and "year, month, and date of opening" of the consumable. For a consumable that is managed as an unused stock at the site 104, no information is set in the "year, month, and date of opening".

The data table further manages flag information indicating whether each consumable is passed its "expiration date" and "expiration date for consumption after opening". The consumable having a "manufacturing management number" of "SNxxxxxxxxxxxxxxxx" is illustrated to be passed the "expiration date for consumption after opening" managed by the data table illustrated in FIG. 7A. The consumable having a "manufacturing management number" of "SNxxxxxxxxxxxxxzzz" is illustrated to be passed "expiration year, month, and date for consumption" managed by the data table illustrated in FIG. 7A.

The inventory management unit 504 may register information about a consumable into the list of expired consumables when it is a predetermined number of days to the expiration date for consumption or the expiration date for consumption after opening. In other words, the inventory management unit 504 identifies a delivered consumable that reaches the expiration date for consumption or the expiration date for consumption after opening after a lapse of a predetermined time. The predetermined time can be set as appropriate within the range of one to several days or so, in consideration of the material of the material included in the consumable and the usage by the customer.

The consumable management unit 503 performs control to transmit the expired consumable list illustrated in FIG. 7C to the monitoring apparatus 410 monitoring the forming apparatus 101 owned by the customer concerned. Using the information, the monitoring apparatus 410 inhibits the use of the expired consumables by the forming apparatus 101.

FIG. 8 is a flowchart for describing distribution processing of the expired consumable list (FIG. 7C), performed by the consumable management unit 503 of the management system 102.

In step S801, the consumable management unit 503 obtains the expired consumable list (FIG. 7C) stored in the storage device 304.

In step S802, the consumable management unit 503 generates a message including the expired consumable list.

In step S803, the consumable management unit 503 generates a distribution instruction for the monitoring apparatus 410 monitoring the forming apparatus 101 that uses the consumables included in the expired consumable list. The distribution instruction includes the message generated in step S802. The monitoring apparatus 410 can be identified based on the "customer ID" of "aaa". The consumable management unit 503 registers the generated distribution instruction into the system control unit 501.

The system control unit 501 receives a regular inquiry from the monitoring apparatus 410 via the communication control unit 506. After the registration of the distribution information by the consumable management unit 503, the system control unit 501 instructs the communication management control unit 506 to transmit the distribution instruction to the monitoring apparatus 410 as a response to the inquiry.

The consumable management unit 503 is assumed to execute the present processing in response to a notification of a change in the contents of the expired consumable list from the inventory management unit 504.

Figure 9A:
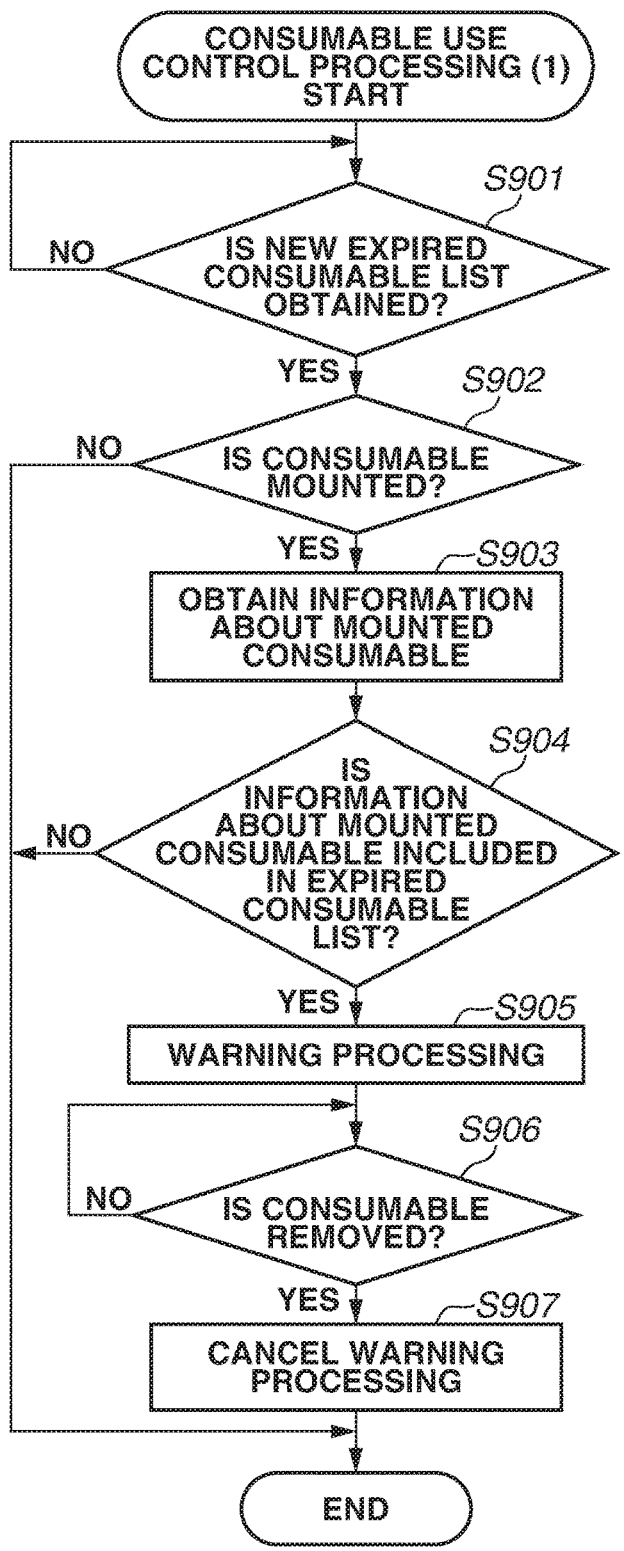
FIGS. 9A and 9B are flowcharts for describing consumable use control processing by a monitoring apparatus.
Figure 9B:
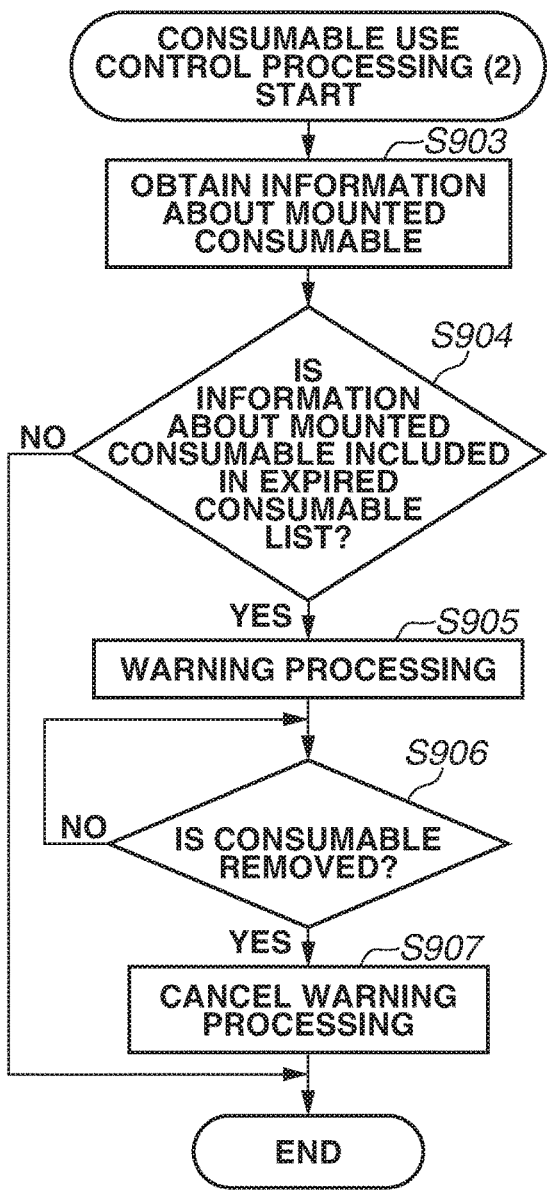

FIGS. 9A and 9B are flowcharts for describing consumable use control processing based on the expired consumable list by the consumable management unit 413 of the monitoring apparatus 410. Processing for the consumable management unit 413 to execute at a timing when the expired consumable list is obtained from the management system 102 and at a timing when a consumable is mounted on the forming apparatus 101 will be described.

FIG. 9A illustrates the processing to be executed at the timing when the expired consumable list is obtained from the management system 102.

In step S901, the consumable management unit 413 checks whether a new expired consumable list is obtained. This is equivalent to checking whether the stored expired consumable list is updated by the monitoring unit 411. If a new expired consumable list is determined to be obtained (YES in step S901), the processing proceeds to step S902.

In step S902, the consumable management unit 413 determines whether a consumable is mounted on the forming apparatus 101. The state of mounting can be obtained from the consumable material replenishment unit 209. If a consumable is determined to be mounted (YES in step S902), the processing proceeds to step S903. If not (NO in step S902), the present processing ends.

In step S903, the consumable management unit 413 obtains information about the mounted consumable, such as the type of consumable and the individual identification information about the consumable. The information about the mounted consumable is stored in the storage device 204. In step S904, the consumable management unit 413 determines whether the information about the mounted consumable is included in the expired consumable list. If the information about the mounted consumable is included in the expired consumable list (YES in step S904), the processing proceeds to step S905. If the information about the mounted consumable is determined to not be included (NO in step S904), the present processing ends.

In step S905, the consumable management unit 413 displays, on-screen via the input/output device 212, a warning indicating that an expired consumable is mounted. The display contents include the model name, the year, month, and date of delivery, and the year, month, and date of opening of the consumable. If the expiration date for consumption has expired, the consumable management unit 413 further displays the expiration year, month, and date for consumption. If the expiration date for consumption after opening has expired, the consumable management unit 413 further displays the year, month, and date indicating the expiration date for consumption after opening. The number(s) of days elapsed since the expiration date(s) may be displayed.

If the expired consumable list includes the information about the mounted consumable as that of a consumable about to expire, the consumable management unit 413 displays the expiration year, month, and date for consumption and the year, month, and date indicating the expiration date for consumption after opening in addition to the model name, the year, month, and date of delivery, and the year, month, and date of opening. The consumable management unit 413 may display a message for prompting the user to use up the consumable early.

In step S905, if information about a consumable having the same model name is registered in the expired consumable list, the consumable management unit 413 may also display the information about the consumable to prevent replacement with an expired consumable.

In step S906, the consumable management unit 413 determines whether the consumable is removed from the forming apparatus 101. The consumable management unit 413 obtains the state of mounting from the consumable material replenishment unit 209 and makes the determination. Only if the consumable is determined to be removed (YES in step S906), the processing proceeds to step S907.

In step S907, the consumable management unit 413 cancels the warning processing executed in step S905. In other words, the consumable management unit 413 ends the warning display.

The consumable management unit 413 may be caused to execute the processing of step S902 to S907 described above by interrupt processing when the monitoring unit 411 communicates with the forming control unit 402 and detects a start of forming processing.

FIG. 9B illustrates the processing to be executed at the timing when a consumable is mounted on the forming apparatus 101.

The processing of steps S903 to S907 is similar to that described in FIG. 9A, executed by the consumable management unit 413. A description thereof will thus be omitted.

According to the present processing, the use of an expired consumable can be prevented when the consumable is mounted.

FIGS. 10A and 10B are diagrams illustrating examples of the warning screen displayed in step S905.

FIG. 10A illustrates a warning screen which displays a warning message for prompting replacement of a consumable. The warning screen displays the model name (forming PLA white: ABC0001), the year, month, and date of delivery, and the year, month, and date of opening of the consumable, and that the consumable is four days passed its expiration date for consumption after opening. The warning screen further displays information that delivery of a consumable of the same model has been arranged. Such information is displayed if the information is obtained as well at a timing when the monitoring unit 411 obtains the expired consumable list from the management system 102.

FIG. 10B illustrates a warning screen that is displayed if forming processing is attempted to be started with an expired consumable mounted on the forming apparatus 101. Like FIG. 10A, the warning screen displays the model name (forming PLA white: ABC0001), the year, month, and date of delivery, and the year, month, and date of opening of the consumable, and that the consumable is four days passed its expiration date for consumption after opening.

FIG. 10B provides a "YES" button so that this warning can be ignored to start the forming processing by the user's decision. If the user presses a "RETURN" button here, the forming processing is once cancelled so that the consumable can be replaced.

Figure 11:
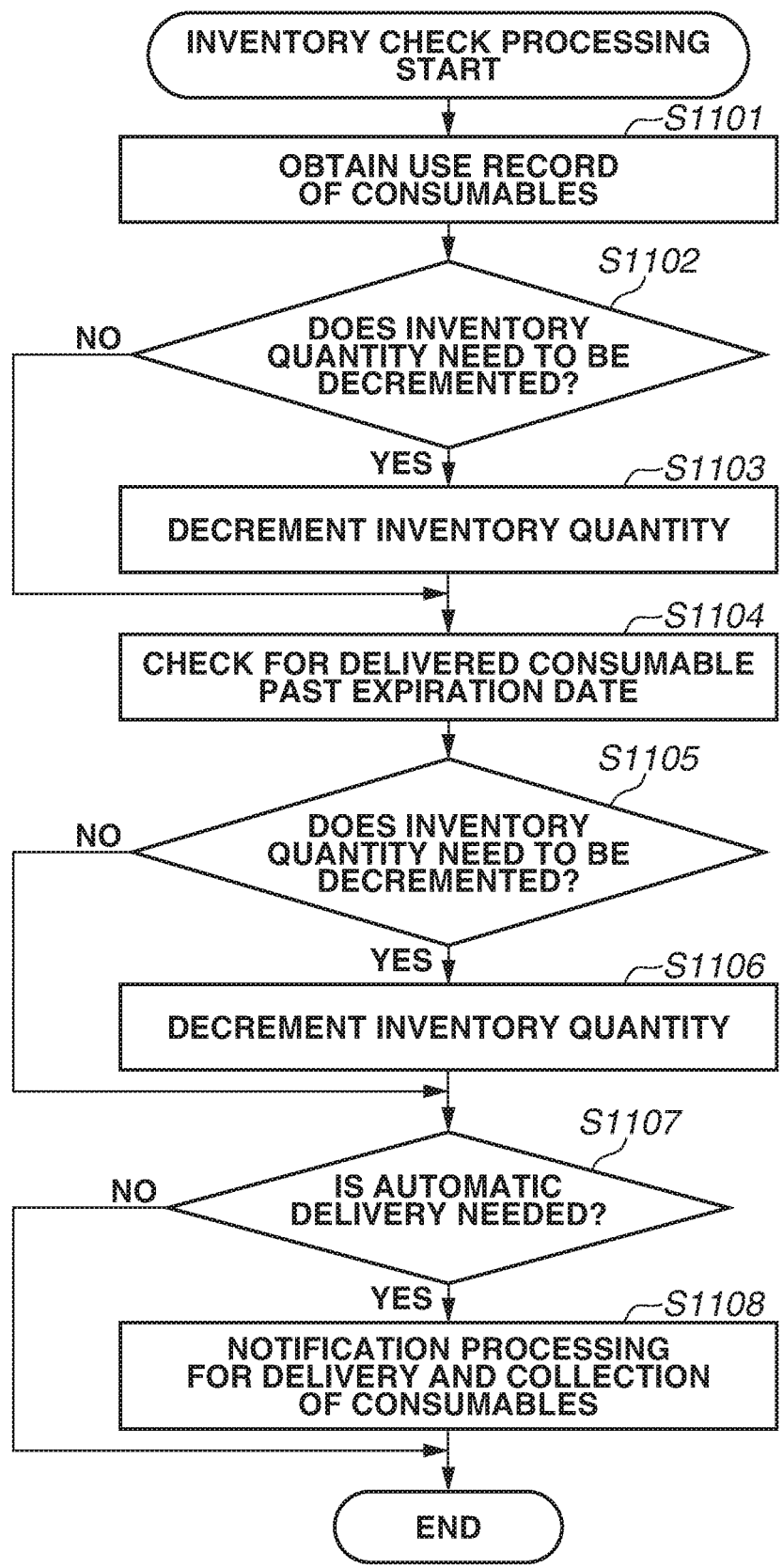
FIG. 11 is a flowchart for describing processing for arranging delivery of consumables by the management system.

FIG. 11 is a flowchart for describing processing for automatically delivering a consumable. The processing is executed by the inventory management unit 504 of the management system 102.

FIG. 12 an inventory management table managed by the inventory management unit 504. Such an inventory management table is managed for each customer and for each type of consumable.

The inventory management table manages a "customer ID" which indicates the identification information about the customer, a "forming apparatus identifier" which indicates the individual identification information about the forming apparatus 101, a "consumable model name", and a management status of an inventory of the consumable. An "upper limit of inventory" indicates the upper limit of the consumable concerned that can be stocked in an inventory storage location of the customer concerned. An "out-of-inventory threshold" indicates a threshold for determining a timing when to arrange delivery of a new consumable to the inventory storage location. An "inventory quantity" indicates the remaining quantity (number or weight) of the consumable stocked in the inventory storage location.

Some forming apparatuses are configured so that the consumable material replenishment unit 209 is directly replenished with a material from a consumable, instead of a consumable containing a material, like a bottle, being mounted on the forming apparatuses. In such a case, the inventory quantity is managed in terms of the weight or length of the material based on the amount of the material used by the forming apparatus 101 (the amount of the material that the consumable material replenishment unit 209 supplies to the forming unit 208) transmitted from the monitoring apparatus 410. In order for the management system 102 to handle the year, month, and date of opening of such a consumable, the user inputs the model name, the individual identification information, and a use start date of the consumable via the input/output device 212 of the forming apparatus 101. The monitoring apparatus 410 transmits the input contents as a piece of operation information about the consumable to the management system 102.

If the "inventory quantity" falls below the "out-of-inventory threshold", the inventory management unit 504 automatically determines that automatic delivery of the consumable up to the "upper limit of inventory" is to be arranged. The inventory management unit 504 can arrange the automatic delivery of the consumable by transmitting an email notifying of the information about the consumable and the quantity of delivery to the mail address of the serviceperson.

Returning to FIG. 11, the processing executed by the inventory management unit 504 will be described. The present processing is executed at a timing when a message indicating replacement of a consumable in the forming apparatus 101 or a message indicating the amount of a material used in the forming apparatus 101 is transmitted from the monitoring apparatus 410.

In step S1101, the inventory management unit 504 obtains a use record of consumables from the storage device 304. Operation information about consumables, which has been transmitted via the monitoring apparatus 410, may include a message indicating replacement of a consumable in the forming apparatus 101 or a message indicating the amount of a material used in the forming apparatus 101. Based on an analysis of such messages, the use record of consumables is stored in the storage device 304.

In step S1102, the inventory management unit 504 determines whether to decrement the inventory quantity in the inventory management table illustrated in FIG. 12. If it is identified that a consumable stocked by the customer has run out of the material and a new consumable is in use, the inventory quantity is determined to be decremented. In step S1102, if the inventory quantity is determined to be decremented (YES in step S1102), the processing proceeds to step S1103. If the inventory quantity is determined to not need to be decremented (NO in step S1102), the processing proceeds to step S1104. In step S1103, the inventory management unit 504 decrements the inventory quantity in the inventory management table.

In step S1104, the inventory management unit 504 checks consumables delivered to the inventory storage location of the site 104 where the monitoring apparatus 410 is as to whether there is any one of the consumables that is passed its expiration date for consumption or its expiration date for consumption after opening. Such determination is made based on the information managed by the data tables illustrated in the foregoing FIGS. 7A and 7B. If there is a delivered consumable that is passed at least either the expiration date for consumption or the expiration date for consumption after opening, the inventory management unit 504 registers the information about the consumable into the expired consumable list illustrated in FIG. 7C.

In step S1105, the inventory management unit 504 determines, based on a result of the check in step S1104, whether to decrement the inventory quantity in the inventory management table illustrated in FIG. 12. A consumable that is passed at least either the expiration date for consumption or the expiration date for consumption after opening is to be replaced, and its inventory quantity is to be decremented. In step S1105, if the inventory quantity is determined to be decremented (YES in step S1105), the processing proceeds to step S1106. If the inventory quantity is determined to not need to be decremented (NO in step S1105), the processing proceeds to step S1107. In step S1106, the inventory management unit 504 decrements the inventory quantity in the inventory management table.

In step S1107, the inventory management unit 504 determines whether the automatic delivery of new consumables is needed. As described above, the determination is made by comparing the value of the "inventory quantity" and the value of the "out-of-inventory threshold" in the inventory management table. As a result of the comparison, if the automatic delivery is determined to be needed (YES in step S1107), the processing proceeds to step S1108. The processing also proceeds to step S1108 if, in step S1104, there is determined to be a consumable that is passed at least either the expiration date for consumption or the expiration date for consumption after opening.

In step S1108, the inventory management unit 504 notifies the serviceperson of information for arranging the delivery of a new consumable and the collection of a delivered consumable. By such notification processing, a notification including customer information about the destination of the delivery, the model name and the quantity of consumable to be delivered, and if there is a consumable to be collected, the model name and the individual identification information about the consumable is transmitted to the serviceperson by email.

FIG. 13 is a flowchart for describing processing for expiration date management of a delivered consumable (inventory), executed by the inventory management unit 504 of the management system 102.

Processing similar to that illustrated in FIG. 11 is designated by the same reference numerals. A detailed description thereof will be omitted here.

In step S1301, the inventory management unit 504 determines whether it is a timing (check timing) to check a delivered consumable for expiration. In the exemplary embodiment of the disclosure, the inventory management unit 504 performs such check processing as batch processing to be executed on a regular basis. The inventory management unit 504 checks the inventory storage locations of all customers owning forming apparatuses to be managed by the management system 102.

In step S1301, if it is determined to be the check timing (YES in step S1301), the processing proceeds to step S1104. The inventory management unit 504 then executes the processing of the foregoing steps S1104 to S1106 and S1108.

Application Example 1

In the foregoing exemplary embodiment, the expired consumable list is generated by the management system 102. However, the expired consumable list may be generated by the monitoring apparatus 410.

Specifically, the monitoring apparatus 410 obtains the information managed by the data tables illustrated in FIGS. 7A and 7B from the management system 102 instead of the expired consumable list, and stores the information into the storage device 204. The monitoring unit 411 can generate the expired consumable list from that information, information about mounted consumables, and the current time which can be obtained from a clock in the forming apparatus 101. Using the expired consumable list generated here, the monitoring apparatus 410 performs processing as described with reference to FIGS. 10A and 10B.

Application Example 2

The management system 102 may perform inventory management in consideration of environmental information such as a temperature and a humidity of the inventory storage location of the consumables at the site 104. In such a case, the serviceperson manually registers average temperature and humidity of the inventory storage location in the management system 102.

The management system 102 may be able to set a threshold for registering the consumables managed in the inventory storage location into the expired consumable list earlier if the average temperature and humidity of the inventory storage location are outside the range of a recommended temperature and a recommended humidity included in the quality information about the consumables.

Application Example 3

According to an exemplary embodiment of the disclosure, if the material included in a consumable is food, a best-before date of the food may be used as the expiration date for consumption.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-072592, filed Mar. 31, 2016, which is hereby incorporated by reference herein in its entirety.

What is claimed is:

1. A management system for managing operation information about a forming apparatus configured to form a three-dimensional object, the operation information being transmitted via a network from a monitoring apparatus configured to monitor the forming apparatus, the management system comprising:
a management unit configured to manage, in a storage device, identification information about one or more consumables including a material delivered for the forming apparatus, wherein the management unit is further configured to manage a first value used for determining a first expiration date for consumption after manufacturing of each consumable and a second value used for determining a second expiration date for consumption after opening of each consumable;
a reception unit configured to receive a message including identification information of a consumable and information equivalent to a time of opening of the consumable from the monitoring apparatus;
a determination unit configured to perform a first determination based on the managed first value and a second determination based on the managed second value and the information included in the received message so that a consumable is determined from among one or more consumables identified by the identification information managed by the management unit; and
a transmission unit configured to transmit a list including the identification information about the consumable determined by at least one of the first determination and the second determination to the monitoring apparatus,
wherein, by the first determination, a consumable that has passed the first expiration date or one that reaches the first expiration date after a lapse of a first predetermined time is determined from among the one or more consumables including an unused consumable, and
wherein, by the second determination, a consumable that has passed the second expiration date or one that reaches the second expiration date after a lapse of a predetermined time is determined from among one or more consumables identified by the identification information included in each of one or more messages that the reception unit has received, and
wherein, if the consumable identified by the identification information included in the list is mounted in the forming apparatus, a warning comprising at least one of the first and second expiration dates and information about a consumable identified by another identification information included in the list having a same model as the consumable identified by the identification information is displayed by the monitoring apparatus.

2. The management system according to claim 1,
wherein the management unit is configured to manage a quantity of a delivered consumable, identification information about the delivered consumable, and a threshold for determining a timing to deliver a new consumable,
wherein the management system further comprises a comparison unit configured to decrement the quantity of delivered consumable according to operation information about a consumable transmitted from the monitoring apparatus, and perform a comparison between the decremented quantity of consumable and the threshold, and
wherein a notification for delivering a new consumable is performed according to a result of the comparison.

3. The management system according to claim 2, wherein the comparison unit is configured to decrement the quantity of consumable based on the determined consumable, and perform the comparison between the decremented quantity of consumable and the threshold.

4. The management system according to claim 1, wherein the information equivalent to the time of opening of the consumable is a time when the consumable is mounted on the forming apparatus.

5. The management system according to claim 1, wherein the monitoring apparatus is built in the forming apparatus.

6. A method for a management system for managing operation information about a forming apparatus configured to form a three-dimensional object, the operation information being transmitted via a network from a monitoring apparatus configured to monitor the forming apparatus, the method comprising:

managing, in a storage device, identification information about one or more consumables including a material delivered for the forming apparatus, wherein the managing further manages a first value used for determining a first expiration date for consumption after manufacturing of each consumable and a second value used for determining a second expiration date for consumption after opening of each consumable;

receiving a message including identification information of a consumable and information equivalent to a time of opening of the consumable from the monitoring apparatus;

performing a first determination based on the managed first value and a second determination based on the managed second value and the information included in the received message so that a consumable is determined from among one or more consumables identified by the identification information managed by the managing; and transmitting a list including the identification information about the consumable determined by at least one of the first determination and the second determination to the monitoring apparatus, wherein, by the first determination, a consumable that has passed the first expiration date or one that reaches the first expiration date after a lapse of a first predetermined time is determined from among the one or more consumables including an unused consumable, and wherein, by the second determination, a consumable that has passed the second expiration date or one that reaches the second expiration date after a lapse of a predetermined time is determined from among one or more consumables identified by the identification information included in each of one or more messages that the receiving has received, and wherein, if the consumable identified by the identification information included in the list is mounted in the forming apparatus, a warning comprising at least one of the first and second expiration dates and information about a consumable identified by another identification information included in the list having a same model as the consumable identified by the identification information is displayed by the monitoring apparatus.

7. The method according to claim 6, wherein the managing manages a quantity of a delivered consumable, identification information about the delivered consumable, and a threshold for determining a timing to deliver a new consumable, wherein the managing further comprises decrementing the quantity of delivered consumable according to operation information about a consumable transmitted from the monitoring apparatus, and performing a comparison between the decremented quantity of consumable and the threshold, and wherein a notification for delivering a new consumable is performed according to a result of the comparison.

8. The method according to claim 7, further comprising decrementing the quantity of consumable based on the determined consumable, and performing the comparison between the decremented quantity of consumable and the threshold.

9. The method according to claim 6, wherein the information equivalent to the time of opening of the consumable is a time when the consumable is mounted on the forming apparatus.

10. The method according to claim 6, wherein the monitoring apparatus is built in the forming apparatus.

* * * * *